Nov. 1, 1938.  B. MAYER  2,134,979

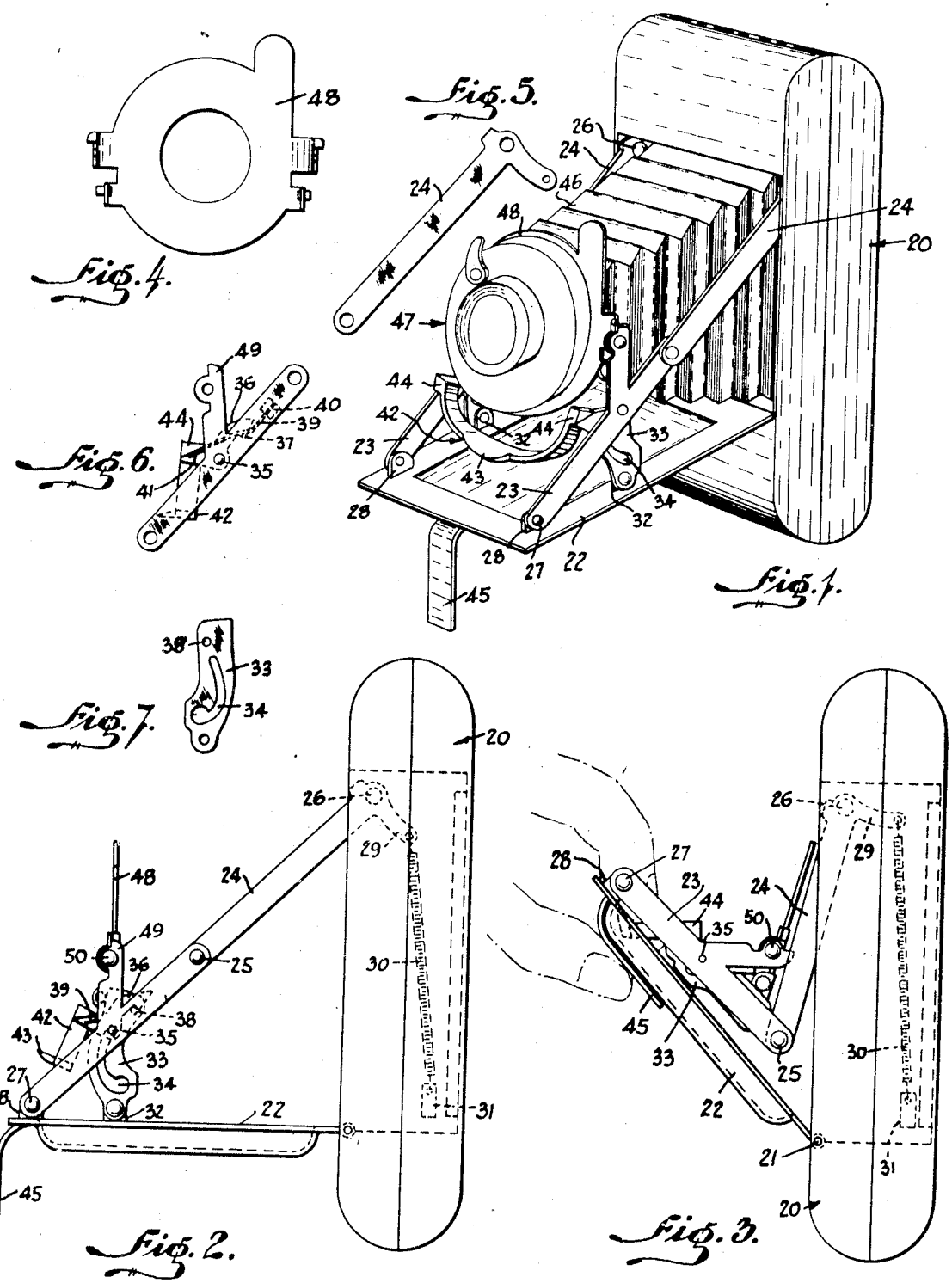

PHOTOGRAPHIC CAMERA

Filed March 12, 1938  2 Sheets-Sheet 2

INVENTOR.
Bruno Mayer.
BY Maxwell E. Sparrow
ATTORNEY.

Patented Nov. 1, 1938

2,134,979

UNITED STATES PATENT OFFICE 2,134,979

PHOTOGRAPHIC CAMERA

Bruno Mayer, New York, N. Y.

Application March 12, 1938, Serial No. 195,468

20 Claims. (Cl. 95—40)

The invention relates to photographic cameras and more particularly to a camera of the collapsible type, wherein a pivoted brace arrangement is used for holding the opened camera in the desired position.

It is an object of the present invention to provide very simple, practical, efficient and economical means for releasing the locking mechanism which maintains said brace arrangement in operative position, whereby the camera may be facilitatingly collapsed.

It is another object of this invention to provide an unlocking mechanism for said brace arrangement and which is operable from a point substantially along or in front of the vertical axis of the lens arrangement.

A further object of the present invention is to provide means for locking said brace arrangement and for releasing the latter from its locked position, said means including laterally disposed latches or locks and a member connecting the latter and operable by a finger of a hand.

It is still a further object of this invention to provide means arranged substantially externally of the camera casing for manipulating the aforesaid connecting member.

Still another object of the invention is to dispose and connect the said manipulating means with relation to the aforesaid member such that a sliding or swinging movement of the said manipulating means causes swinging movement of said member to release the brace-locking mechanism.

It is still another object of the present invention to construct and arrange the aforesaid manipulating means whereby said latter means is contained within the front rest lever of the camera, when in inoperative position.

It is a further object of this invention to combine the front rest lever with the said manipulating means in such a manner that the said rest lever will function as a closure for the said manipulating means when both are in inoperative positions.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting certain forms of the invention have been annexed as a part of this disclosure, and in such drawings, like characters of reference denote corresponding parts throughout all the views, of which:

Fig. 1 is a perspective view of the camera embodying the invention showing the same in extended position.

Fig. 2 is a side elevational view of the frame and associate mechanism in fully extended position, the bellows and lens being removed.

Fig. 3 is a view similar to Fig. 2 except that the camera casing is shown as being in partially collapsed position.

Figs. 4 to 7 are views showing different parts of the mechanism which form parts of the invention.

Figure 8:
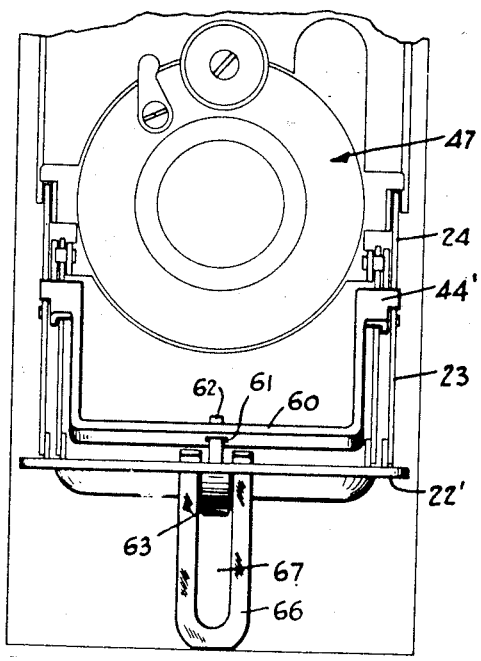
Fig. 8 is a partial front elevational view of another embodiment of the invention.

Referring particularly to Figs. 1 to 3 there is disclosed a camera housing or casing 20 having swingably attached thereto at 21 a cover 22. Pivotally or swingably connected to housing 20 and cover 22 are a pair of pivoted braces, each brace comprising a pair of arms 23 and 24 pivotally joined together at 25. Arm 24 of each brace is pivotally connected within the housing 20 at 26 and arm 23 of each brace is pivotally connected at 27 to lugs 28 fixed to the forward part of the cover 22. Each arm 24 has the conventional extension 29 to which is attached one end of a helical spring 30, the other end of said spring 30 being fixed to a member 31, located within the housing 20. These springs 30 cause the cover 22 to spring open in a conventional manner with the braces in extended position.

Pivotally attached to lugs 32 (which are fixed to the inside of cover 22) are a pair of plates 33 provided with arcuate guide slots 34, the arms 23 having projections 35 which ride in said slots 34 upon opening and closing of the cover 22. Between each plate 33 and arm 23 and pivotally mounted on each pin or projection 35 is a lock member 36 which, when the cover and braces are in complete open positions (as seen in Figs.

1 and 2), is held with its hooked portion 37 in engagement with a pin 38. Pin 38 is fixed to plate 33 by a spring 39, secured at one end to arm 23 as indicated at 40 (Fig. 6), the other end 41 of said spring 39 being secured to hooked member or dog 37. Thus the cover 22 is maintained or locked in opened position, since the arms 23 and 24 of the braces are prevented from collapsing during operation of the camera.

Bridging or substantially bridging the lock member 36 is a bar 42 which may be substantially U-shaped having a finger-rest 43. Bar 42 has lateral end projections 44 providing stops for a purpose about to be explained.

As heretofore stated when the cover 22 is sprung open fully extending the arms 23 and 24 lock members 36 become operable to prevent collapsing of the arms and closing of the cover, during the period of use of the camera, at which time the conventional pivoted front rest 45 may be employed.

When it is desired to close the camera and to collapse arms 23 and 24, bar 42 may be engaged with a finger of a hand and thereby moved rearwardly, that is, toward the housing 22, until stops 44 abut against the edges of arms 23. This movement pivots each lock member 36 about pins 35 releasing the hook or latch portion 37 from pin 38.

Now, with the latch members 37 in unlocked position and the stops 44 bearing against arms 23 the cover 22 is forced upwardly to closing position using only one finger and the thumb of the hand as clearly shown in Fig. 3.

Of course, it is understood that the collapsible camera is provided with the conventional bellows 46, lens mechanism 47 and lens holder 48. Each arm 23 is provided with an extension 49 by which the lens holder 48 and arm 23 is maintained in pivoted relation as indicated at 50.

The bar or bridge 42 by means of its U-shaped construction clears the lens mechanism 47 during opening and closing of the camera.

Figure 9:
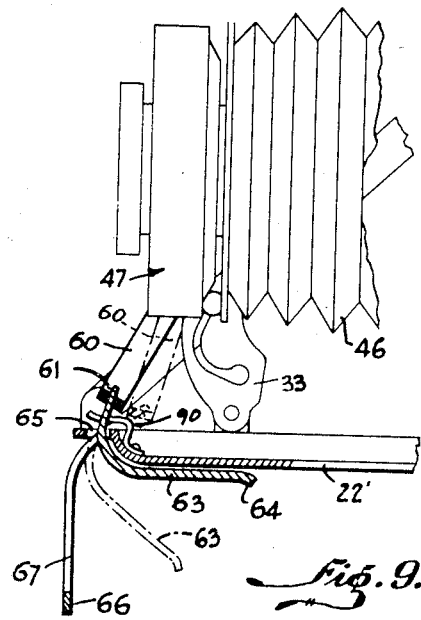
Fig. 9 is a side view partially in section of Fig. 8.

Figs. 8 to 11 disclose another embodiment of the invention, in which the bar or bridge member 60 is provided with the stops 44' for a purpose similar to that of the previously described stops 44, and an opening 61 through which projects the tongue portion 62 of the operating lever 63 having its free end upturned as indicated at 64. Lever 63 extends through opening 65 of cover 22'. Pivotally attached to cover 22' is a front rest 66, which is substantially U-shaped, its purpose being similar to that heretofore referred to with reference to front rest 45. Rest 66 enters opening 65 and bears against spring 90. Lever 63 is pivoted to front rest 66 by means of a pin (not shown) passing through openings 69 of rest 66, the lever 63 being adapted to be received within the recess or opening 67 between the bifurcations of rest 66, the latter forming a frame substantially surrounding the lever 63 when both are in inoperative positions. Fig. 9 shows in full lines the positions of lever 63 when in inoperative position and rest 67 when in operative position, and in dotted lines the positions of lever 63 and bar 60 when the brace arms are freed for collapsing or folding.

Figure 12:
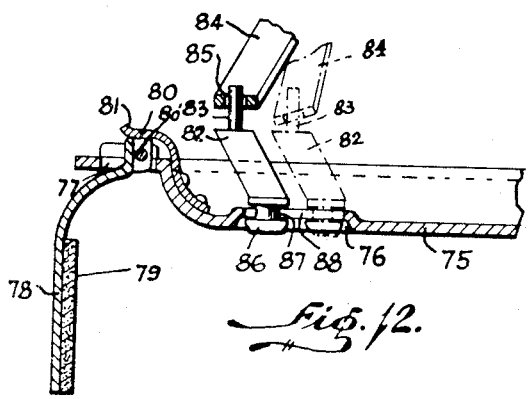
Fig. 12 is a partial sectional view of a further embodiment of the invention.
Figures 10, 11:
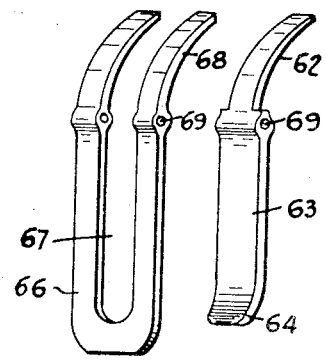
Fig. 10 is a perspective view of the camera front rest.
Fig. 11 is a perspective view of a lever employable in the invention.
Figures 13, 14, 15:
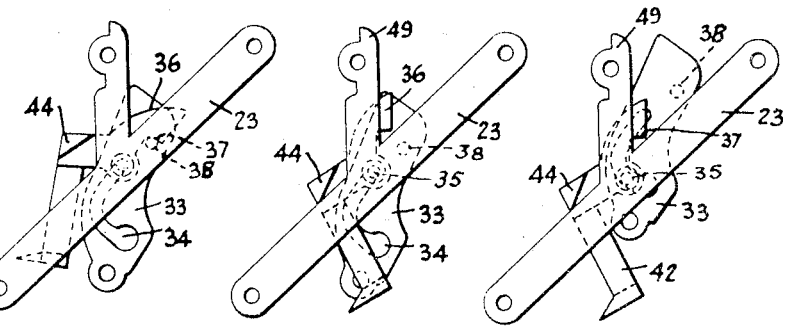
Figs. 13 to 15 are side views showing in diagrammatic form the lever locking and operating mechanism in three different positions.

Fig. 12 discloses a further arrangement of unlocking mechanism. The bridge or bar 84 connecting the locking members has a hole 85 in which loosely fits a pin 83 secured to a member 82. Secured to member 82 is a button or knob 86 having a shank 87 slidable in a slot 88 formed in cover 75 of the camera. It can be readily observed that by moving the button 86 from a position shown in full lines to a position shown in dotted lines, bar 84 is likewise shifted or is swung to the dotted line position thus releasing the locking mechanism to permit collapsing of the brace arms and closing of the camera.

Slot 88 is sunk, as indicated at 76, so that knob 86 is substantially flush with the top surface of cover 75. Front rest 78 which is pivoted to cover 75 at 80' projects therethrough at 77 and bears against spring 80 secured to the cover, the spring 80 having an upturned end 81 to facilitate engagement thereof with rest 78 for positioning the latter in operative position. On the underface of rest 78 may be arranged a pad 79. Button 86 and slot 88 are immediately under this pad so that when the rest 78 is in inoperative position it acts as a closure for the button and slot, the pad preventing dust from entering the camera through the slot.

Providing the lever 67 (Fig. 9) or lever 78 (Fig. 12) permits simultaneous release of the locking mechanism and closing of the camera from the outside of the cover.

From the foregoing description, taken in connection with the accompanying drawings, the advantages of the construction and operation of the device shown will be readily understood by those skilled in the art to which the invention pertains; and while I have described the principle of operation, together with the device which I now consider to be the best embodiments thereof, I desire to have it understood that the device shown is merely illustrative and that such changes may be made as are within the scope of the appended claims.

I claim:

1. In a photographic camera of the collapsible type having a housing with an open front, a drop cover for said front and a pair of braces, each brace including a pair of pivoted arms, one of said arms being pivotally connected to said housing and the other of said arms being pivotally connected to said cover; means for maintaining each of said braces in extended position, and means connected with said former means for simultaneously releasing and actuating said former means whereby said arms may be respectively brought toward each other to close said cover.

2. In a photographic camera of the collapsible type having a housing with an open front, a swingable cover for said front and a pair of pivoted braces, each of said braces connected to said cover and said housing respectively; means for maintaining each of said braces in extended position, and means connecting said former means for simultaneously releasing said former means and facilitating actuation of said braces to close said cover.

3. In combination with a photographic camera of the collapsible type having a casing and a swingable cover therefor and a pair of pivoted braces connecting said housing and said cover, of locking means for holding each of said braces in extended position, and means for releasing said first means whereby said braces may be actuated to close said cover, said latter means comprising a bridging member connecting said first means.

4. In combination with a photographic camera of the collapsible type having a casing and a swingable cover therefor and a pair of pivoted braces connecting said housing and said cover, of locking means for holding each of said braces in extended position, and means for releasing said first means whereby said braces may be actuated to close said cover, said latter means comprising finger engaging means connecting said first means.

5. In combination with a photographic camera of the collapsible type having a casing, a swingable cover therefor, and a pair of pivotally connected arms at each side of and pivotally connecting said casing and said cover, of locking means pivotally arranged at each of said sides and at one arm of each pair for holding each pair of arms substantially in alignment when said cover is in open position, and means for actuating said locking means substantially from therebetween to releasably disengage said locking means and to facilitate retraction of each of said arms into said casing, when said cover is in closed position.

6. In a photographic camera having a housing with an open front, a swingable cover for said front and a pair of pivoted braces swingably connected with said housing and said cover at each side thereof; means for releasably engaging each pair of said braces to maintain said braces in one position and to move the same in another position, and means connected with said first means for actuating the latter, said second means including a projection at each end thereof, each of said projections adapted to engage each of said braces when said second means actuate said first means.

7. In a photographic camera having a housing with an open front, a swingable cover for said front and a pair of pivoted braces swingably connected with said housing and said cover at each side thereof; means for releasably engaging each pair of said braces to maintain said braces in one position and to move the same in another position, and means connected with said first means for actuating the latter, said second means including a projection at each end thereof and a finger-rest therebetween, each of said projections adapted to engage a respective brace when said second means actuate said first means by movement of a finger to close said cover.

8. In a photographic camera having a housing with an open front, a swingable cover for said front and a pair of pivoted braces swingably connected with said housing and said cover at each side thereof; means for releasably engaging each pair of said braces to maintain said braces in one position and to move the same in another position, and means connected with said first means and pivotally joined to said braces, said second means adapted by an inward movement thereof to disengage said first means and engage said braces to close said cover.

9. In a photographic camera having a housing with an open front, a swingable cover for said front and a pair of pivoted braces swingably connected with said housing and said cover at each side thereof; means for releasably engaging each pair of said braces to maintain said braces in one position and to move the same in another position, and means connected with said first means and pivotally joined to said braces and including stops adjacent said braces whereby a rearward movement of said second means will disengage said first means and abut said braces to close said cover.

10. In a photographic camera having a housing with an open front, a swingable cover for said front and a pair of pivoted braces swingably connected with said housing and said cover at each side thereof; means for releasably engaging each pair of said braces to maintain said braces in one position and to move the same in another position, and a substantially U-shaped member connecting said means for actuating the latter and for engaging the said braces to close said cover.

11. In a photographic camera having a housing with an open front, a swingable cover for said front and a pair of pivoted braces swingably connected with said housing and said cover at each side thereof; means for releasably engaging each pair of said braces to maintain said braces in one position and to move the same in another position, and a substantially U-shaped member connecting said means for actuating the latter and for engaging the said braces to close said cover, said member having a finger-rest for facilitating actuation of said member.

12. In combination with a photographic camera of the collapsible type having a casing with an open front, a swingable cover therefor and a pair of pivoted braces connecting said casing and said cover, of means for maintaining each of said braces in extended position, means connecting said first means for simultaneously releasing said first means and facilitating actuation of said braces to close said cover, and means connected to said second means for operating the latter substantially externally of said cover.

13. In combination with a photographic camera of the collapsible type having a casing with an open front, a swingable cover therefor and a pair of pivoted braces connecting said casing and said cover, of means for maintaining each of said braces in extended position, and means connecting said first means for simultaneously releasing said first means and facilitating actuation of said braces to close said cover, said second means being operable substantially from without said cover.

14. In combination with a photographic camera of the collapsible type having a casing with an open front, a swingable cover therefor and a pair of pivoted braces connecting said casing and said cover, of means for maintaining each of said braces in extended position, means connecting said first means for simultaneously releasing said first means and facilitating actuation of said braces to close said cover, said second means being operable substantially from without said cover, and a member articulatedly connected to said second means and projecting through said cover for operating said second means.

15. In combination with a photographic camera of the collapsible type having a casing with an open front, a swingable cover therefor and a pair of pivoted braces connecting said casing and said cover, of means for maintaining each of said braces in extended position, means connecting said first means for simultaneously releasing said first means and facilitating actuation of said braces to close said cover, and a member articulatedly connected to said second means, said second means being operable by movement of said member externally of said cover.

16. In combination with a photographic camera of the collapsible type having a casing with an open front, a swingable cover therefor and a pair of pivoted braces connecting said casing and said cover, of means for maintaining each of said braces in extended position, means connecting said first means for simultaneously releasing said first means and facilitating actuation of said braces to close said cover, and a member connected to said second means and extending through said cover, said second means being operable by movement of said member externally of said cover.

17. In combination with a photographic camera of the collapsible type having a casing with an open front, a swingable cover therefor and a pair of pivoted braces connecting said casing and said cover, of means for maintaining each of said braces in extended position, means connecting said first means for simultaneously releasing said first means and facilitating actuation of said braces to close said cover, and a member connected to said second means and extending through said cover, said second means being operable by movement of said member externally of said cover, said member being swingable and adapted to abut against a face of said cover.

18. In combination with a photographic camera of the collapsible type having a casing with an open front, a swingable cover therefor and a pair of pivoted braces connecting said casing and said cover, of means for maintaining each of said braces in extended position, means connecting said first means for simultaneously releasing said first means and facilitating actuation of said braces to close said cover, and a member connected to said second means and extending through said cover, said second means being operable by movement of said member externally of said cover, said cover having a recess, said member being substantially receivable within said recess.

19. In combination with a photographic camera of the collapsible type having a casing with an open front, a swingable cover therefor and a pair of pivoted braces connecting said casing and said cover, of means for maintaining each of said braces in extended position, means connecting said first means for simultaneously releasing said first means and facilitating actuation of said braces to close said cover, and a member connected to said second means and extending through said cover, said second means being operable by movement of said member externally of said cover, said cover having a recess, said member being substantially receivable within said recess, and a swinging member to close said recess, said swinging member adapted as a front rest of said camera when said braces are in extended position.

20. In combination with a photographic camera of the collapsible type having a casing with an open front, a swingable cover therefor and a pair of pivoted braces connecting said casing and said cover, of means for maintaining each of said braces in extended position, means connecting said first means for simultaneously releasing said first means and facilitating actuation of said braces to close said cover, and a member connected to said second means and extending through said cover, said second means being operable by movement of said member externally of said cover, said member being swingable and adapted to abut against a face of said cover, said cover including a recessed part, said part adapted as a front rest of said camera and substantially as a frame for said member.

BRUNO MAYER.